UNITED STATES PATENT OFFICE 2,606,153

SILICONE GREASES

Norman G. Holdstock, Schenectady, N. Y., assignor to General Electric Company, a corporation of New York No Drawing. Application April 25, 1951,
Serial No. 222,948

3 Claims. (Cl. 252—42.1)

This invention is concerned with grease compositions and more particularly is concerned with a grease composition comprising a homogeneous blend of a liquid organopolysiloxane and a grease-forming composition or thickening agent for the grease comprising lithium 2-ethylhexoate.

Greases made with liquid organopolysiloxanes have been found useful in applications involving high temperature conditions. Such greases have been prepared from liquid organopolysiloxanes or silicone oils and soaps such as lithium stearate, lithium hydroxy stearate, lithium myristate, etc. For the most part, the acids used in making the lithium soaps employed with the silicone oils have been of the long-chain type ranging, for example, from about 12 to 18 carbon atoms.

The greases made heretofore using silicone oils as the fluid base required careful preparation since it was often difficult to obtain adequate compatibility, especially when using an all methyl polysiloxane, between the silicone fluid and the soap necessary to thicken them to a grease consistency because the silicone fluid would not tolerate too much of the soap before it began to throw it out. Also, although mixtures of silicone fluids with lithium soaps heretofore employed would operate at higher temperatures than greases made with hydrocarbon oils, nevertheless much remained to be desired, as far as high temperature applications were concerned, since at temperatures above 150° C., the grease would begin to fail usually due to phase changes of the soap.

I have now discovered that a particular combination of ingredients is capable of giving a grease which obviates all the former objections and adds certain advantages nowhere found in greases heretofore prepared. More particularly, I have discovered that a grease made from a mixture comprising a silicone oil as a base fluid and a soap therefor comprising lithium 2-ethylhexoate (also commonly referred to as "lithium octoate") has certain unexpected and unobvious properties not possessed by previously known greases. Greases prepared in accordance with the practice of my invention are eminently stable at temperatures as high as 225° C. and show a marked improvement in lubricity at elevated temperatures over other greases using the lithium soaps heretofore employed and more particularly mentioned above. In addition, I am able to incorporate in my claimed greases higher concentrations of the lithium 2-ethylhexoate with attendant unexpected advantages; namely, a lower bleed rate of the silicone oil at elevated temperatures and lower weight loss thereof. Greases prepared by me have higher dropping points and resist markedly oxidation of the grease at elevated temperatures.

In accordance with my invention, any of the well-known liquid organopolysiloxanes or silicone oils employed in the preparation of greases is blended with lithium 2-ethylhexoate in varying proportions by methods well-known in the art. The organopolysiloxanes employed as the base fluid in my invention may be any one of those which are compatible with the lithium 2-ethylhexoate. Among these are, for example, alkyl, aryl, alkaryl, aralkyl, etc., straight and branch-chain silicone polymers, such as dimethyl, diethyl, ethylmethyl, diphenyl, ditolyl, methyl phenyl, ethyl phenyl silicones and others which conform to the general structure

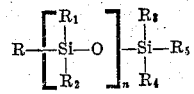

where R, $R_1$, $R_2$, $R_3$, $R_4$ and $R_5$ may be the same or different hydrocarbon radicals and may be any one of those mentioned above, and $n$ may be any whole number greater than 1. Additional examples of straight-chain, branched-chain, and cyclic organopolysiloxanes which may be employed in the practice of the present invention as the base fluids, may be found, for instance, in Patnode Patent 2,469,888 issued May 10, 1949 and assigned to the same assignee as the present invention. The organopolysiloxanes may contain an average of from about 1.75 to 3.0, preferably, from 1.95 to 2.25, organic groups (e. g., methyl, or methyl and phenyl, etc., groups) per silicon atom.

The amount of lithium 2-ethylhexoate which may be employed with the silicone fluid may be varied within substantially wide limits depending upon such factors as, for example, the type of liquid organopolysiloxane base fluid employed, the application for which the grease is intended as, for instance, high temperature or low temperature applications, the method by which the grease is prepared, etc. It has been found that generally the lithium 2-ethylhexoate or, as it will hereinafter be referred to for brevity, the "lithium soap" may vary from about 10 to 50 per cent, preferably from about 20 to 35 per cent of the total weight of the lithium soap and the silicone base fluid.

It will, of course, be understood that in addition to the lithium soap employed with the silicone base fluid, various balancing ingredients, such as oxidation, rust, and corrosion inhibitors, polymer thickeners, extreme pressure additives and the like as exemplified by:

Polymer thickeners:
  Polymethyl methacrylate
  Polybutene
Anti-oxidants:
  4-tertiarybutyl-2-phenyl phenol
  Diphenyl amine
  Mixture of aromatic amines (known as "Ortholeum 300" manufactured by E. I. Du Pont Co.)
  Thiodiphenyl amine
Rust inhibitors:
  Zinc naphthenate
  Barium mahogany sulfonate
  Sorbitan monooleate
Anti-wear additives:
  Tricresyl phosphate may be incorporated with the base fluid as conditions of operation dictate. Total balancing ingredients will be less than 3 per cent, by weight, of the grease composition.

The manner in which the greases described herein may be prepared may be varied. One method comprises dissolving the lithium soap in a solvent therefor, for example, ethanol, and adding the silicone base fluid thereto and forming a homogeneous mixture of the two ingredients, adding, if necessary or if desired, other balancing ingredients or additives. Thereafter, the ethanol may be distilled or removed from the mixture under vacuum and the mixture milled (with or without further additions of silicone fluid) on a 3-roll mill to give a grease having the desired dispersion of the soap in the silicone base fluid.

Another method comprises mixing the lithium 2-ethylhexoate with water, adding the silicone base fluid, and after mixing this thoroughly, the mixture is heated to about 200° C. under vacuum to remove all traces of water. Still another method for making the greases herein described avoids the use of any solvent for the lithium soap but instead uses a diester of a dicarboxylic acid, preferably having 4 or more carbon atoms (e. g., from 4 to 18 carbon atoms) in the chain, as the dispersing medium for the lithium 2-ethylhexoate. The mixture of the diester and the lithium soap may then be heated to form a homogeneous mixture and to this may be added the silicone base fluid which can be further dispersed to give a homogeneous mixture by milling. The diester of the dicarboxylic acid imparts further improvements in the properties of the grease and remains as an integral part thereof. Among such diesters are the aliphatic esters either straight or branched-chain alkyl diesters of aliphatic dicarboxylic acid such as diethyl adipate, di-(2-ethylhexyl) adipate, diethyl pimelate, ditetradecyl sebacate, di-(2-ethylhexyl) sebacate, di-(2-ethylhexyl) azelate, etc. Mixed aliphatic-aromatic diesters are those such as methyl phthalyl ethyl glycolate, and aromatic diesters such as diethyl phthalate, dibutyl phthalate, di-(2-ethylhexyl) phthalate, etc., may also be employed.

In order that those skilled in the art may better understand how the present invention is practiced, the following examples are given by way of illustration and not by way of limitation. All parts are by weight.

*Example 1*

A grease was prepared from 70 parts of lithium 2-ethylhexoate and 140 parts of a polymethyl phenylsiloxane (i. e., silicone oil) containing 25 mol per cent phenyl groups and chain-stopped with trimethylsilyl groups, by heating this mixture to 200° C. until adequate and satisfactory dispersion was obtained of the soap in the oil. The mixture was then allowed to cool and milled on a 3-roll mill to complete the formation of the grease. During this latter milling an additional amount of the above-mentioned silicone oil was added so that there was obtained a grease containing 23 per cent, by weight, thereof of the lithium 2-ethylhexoate. This grease was translucent, heat-stable at 200° C. and work-stable. This grease had a penetration of 283 when measured by the ASTM Penetration Test Method D217-48.

*Example 2*

About 70 parts of lithium 2-ethylhexoate were dissolved in about 316 parts of ethanol to form a solution of the soap in the ethanol. Thereafter 140 parts of the polymethyl phenylsiloxane described in Example 1 were added and the mixture thoroughly mixed until a homogeneous composition was obtained. The ethanol was then distilled off under vacuum and the remaining grease was milled on a 3-roll mill to form a grease of uniform consistency which was suitable for high temperature applications.

*Example 3*

Three hundred (300) parts of the polymethyl phenylsiloxane employed in Example 1 were mixed with 144 parts of 2-ethylhexoic acid and 42 parts lithium hydroxide monohydrate in 300 parts of water. After mixing the ingredients together thoroughly until saponification was complete, the water was distilled off under vacuum and the mixture cooled and milled on a 3-roll mill. Additional silicone oil (50 parts) was added so as to give a grease penetration of 285 and a soap content of 30 per cent. A sample of this grease, when tested in an ASTM tester at room temperature for 50 hours showed an operating temperature only 10° C. above room temperature.

*Example 4*

In this Example 70 parts of lithium 2-ethylhexoate were heated together with 140 parts of a polymethyl phenylsiloxane oil similar to that described in Example 1 to a temperature of 200° C., thereafter cooled and milled during which milling additional oil (96 parts) was added so that a soap concentration of about 23 per cent was present in the mixture. This grease was found to have an ASTM penetration of 283. At 150° C. it was found that the bleeding rate of this grease was 0.57 per cent after 100 hours and the weight loss at this temperature was 3.2 per cent in 50 hours. This grease was tested in an ASTM high temperature ball bearing grease tester described on pages 35 to 36 of Special Technical Bulletin No. 84 published by the American Society for Testing Materials in 1948 in an article entitled "Grease—An Oil Storehouse for Bearings" by Donald F. Wilcock and Marshall Anderson, and it was found that after 8,520 hours at 150° C. it was still operating satisfactorily and did not fail when operated at 200° C. until around 2500 hours.

*Example 5*

A grease having good consistency and appearance was prepared by dissolving 70 parts lithium 2-ethylhexoate in 316 parts ethanol. To this mixture were added 140 parts of the polymethyl phenylsiloxane oil described in Example 1 and the ethanol was distilled and removed under vacuum. The remaining product was milled on the 3-roll mill until a grease was obtained having good thermal and lubricating properties.

Example 6

About 70 parts lithium 2-ethylhexoate were thoroughly mixed with 70 parts di-(2-ethylhexyl) azelate. This mixture was heated to 200° C. for about 30 minutes with stirring to swell the soap. After cooling the mixture, there were added to the mixture 30 parts of a linear methyl polysiloxane oil consisting of dimethyl siloxy units chain-stopped with trimethyl silyl groups having a viscosity of 20 centistokes. The mixture was then milled on a 3-roll mill during which time an additional amount (57 parts) of a mixture of di-(2-ethylhexyl) azelate and methyl silicone oil in a weight ratio of 70 to 30 was added so that the grease had a final soap content, that is, a lithium 2-ethylhexoate content, of 31 per cent. This grease had good lubricating properties and when tested in a Navy gear-wear tester as described in low temperature grease specification MIL-G-3278 dated August 25, 1950 (final specification) published by the military forces and entitled "Grease; Aircraft and Instruments (For Low and High Temperatures)" which determines the lubricating quality of a grease by measuring the weight loss of a brass gear when run against a stainless steel gear, showed a weight loss of 1.7 mg./1000 cycles under a 5-lb. load and 9.0 mg./1000 cycles with a 10-lb. load.

A similar grease as shown in Example 6 but using instead of the lithium 2-ethylhexoate, lithium hydroxystearate (10 per cent by weight of the grease and having the same ASTM penetration), when tested in the same gear-wear tester showed a loss of 0.97 mg./1000 cycles at a 5-lb. load and 9.81 mg./1000 cycles under a 10-lb. load.

Example 7

In this example, 100 parts lithium 2-ethylhexoate were mixed with 200 parts of a trimethylsilyl-chain-stopped methyl phenyl polysiloxane (composed essentially of diphenyl siloxy and dimethyl siloxy units of which 40 per cent of the organic radicals are phenyl radicals) oil in 395 parts ethanol. After mixing the ingredients thoroughly together, the ethanol was stripped by heating the mixture to 200 C. under vacuum. The remaining grease was milled on a 3-roll mill and an additional amount (33 parts) of the methyl phenyl polysiloxane oil was added so that there was a soap content of 30 per cent in the grease. This grease had an ASTM penetration of 252 and showed good high temperature lubricating properties.

Example 8

This example illustrates the preparation of a grease by a method other than those described above. More particularly, 100 parts lithium 2-ethylhexoate were mixed dry with 200 parts of a methyl phenyl polysiloxane oil described in Example 1, in a doughmixer until a smooth homogeneous composition was obtained. This grease was then milled with an additional amount (45 parts) of silicone oil until the soap comprised 29 per cent of the grease. This grease had an ASTM penetration of 258. When the grease was worked 100,000 strokes in an ASTM grease worker (see ASTM designation D217-48), it was noted that the penetration increased to only 301. This is indicative of the outstanding stability of greases prepared in accordance with my invention.

Example 9

Another grease was prepared similarly to that shown in Example 4, with the exception that 100 parts of lithium 2-ethylhexoate were milled with 200 parts of the methyl phenyl polysiloxane oil (shown in Example 1) on the 3-roll mill and thereafter 109 parts of the methyl phenyl polysiloxane oil were added on the rolls to give an ASTM penetration of 320 and a soap content of 24 per cent. In addition, 1.5 parts thiodiphenylamine were added on the rolls to the mixture as an antioxidant. The physical properties of this grease were as follows:

Bleed rate, 0.1 per cent after 100 hrs. at 150° C.
Evaporation, 2 per cent after 100 hrs. at 150° C.
Oxidation (ASTM D942-47T), 3.5 p. s. i. after 50 hrs. at 150° C. in a Norma Hoffman bomb test; 6.5 p. s. i. after 100 hrs. at 150° C. in a Norma Hoffman bomb test
Dropping point, 227° C.

Example 10

Since greases made with lithium 2-ethylhexoate were somewhat more water-soluble than greases using lithium soaps made with longer-chain organic acids, it was found that the water resistance could be improved by adding to the greases described above small amounts of lithium soaps made with longer-chain organic acids. In one case a grease was prepared by mixing together 450 parts lithium 2-ethylhexoate, 50 parts lithium myristate and 500 parts of a methyl phenyl polysiloxane oil similar to that described in Example 1. This mixture was prepared by heating the same at 290° C. and mixing it until a homogeneous composition was obtained. The mixture was cooled and milled on a 3-roll mill while at the same time adding 923 additional parts of the methyl phenyl polysiloxane oil, 24.2 parts sorbitan monooleate as a rust-inhibitor, and 11.1 parts of thiodiphenylamine as an antioxidant. The soap content was 18.4 per cent. The physical properties of this grease were as follows:

Bleed rate, 3.13 per cent after 100 hrs. at 150° C.
Evaporation, 2.28 per cent after 50 hrs. at 150° C.
ASTM worked penetration, 302
Dropping point, 227° C.
Oxidation test, 2.5 p. s. i. loss in 50 hrs. in a Norma Hoffman bomb at 150° C.
Water resistance, 15 per cent loss after 1 hr. spray of water at room temperature on a shielded bearing The grease was tested in an ASTM grease tester similar to that described in Example 4 and did not fail at 400° F. until after 2116 hrs. Although the operating life at this elevated temperature was reduced somewhat by the addition of the lithium myristate, this is still an exceptionally long time to operate at this temperature and is still a much longer period of time than is possible by using other greases made from silicone oils and longer-chain lithium soaps as, for example, lithium laureate, lithium myristate alone, lithium stearate, etc. As can be seen from the above data, the dropping point was not affected (compare Example 9) by the addition of the lithium myristate and a low weight loss on the water resistance test was obtained since an all lithium 2-ethylhexoate grease loses over 90 per cent of the grease under the same conditions.

Example 11

To compare the properties of the lithium 2-ethylhexoate grease at low temperatures with those greases now known in the prior art, three greases were prepared using as the base fluid a mixture of 50 per cent, by weight, low viscosity polybutene (Oronite 70–100–SSU polybutene) and 50 per cent of a methyl silicone oil similar to that used in Example 6. Greases were made from this latter mixture of polybutene and methyl silicone oil by adding in one case 30 per cent, by weight, lithium 2-ethylhexoate based on the total weight of the grease. In another case, 11 per cent lithium hydroxy stearate was added to the base fluid, based on the total weight of the former and the mixture of polybutene and methyl silicone oil. Finally a grease was prepared comprising 23 per cent, by weight thereof, lithium stearate based on the total weight of the latter and the mixture of the polybutene and methyl silicone oil. These greases all had the same ASTM penetration of about 300. It was essential to vary the amounts of soap in each of the greases to obtain comparable penetrations. It has been found that varying to a large degree the soap content in a grease will have little, if any, effect on the lubricating properties of the grease, but the variation of the soap will change the penetration of the grease. It was therefore believed essential that the penetration of each of the three greases described above, rather than that the amount of soap in each grease should be the same since, as pointed out above, the amount of soap in a grease has very little, if any, effect on the lubricating properties of the grease. Each of the three greases was run in a Navy gear wear tester described previously in Example 6 with the following results:

Lithium 2-ethylhexoate grease:
 5 lb. load 1.4 mg./1000 cycles
 10 lb. load 2.6 mg./1000 cycles
Lithium hydroxy stearate grease:
 5 lb. load 1.58 mg./1000 cycles
 10 lb. load 5.17 mg./1000 cycles
Lithium stearate grease:
 5 lb. load 1.81 mg./1000 cycles
 10 lb. load 6.61 mg./1000 cycles The weights indicate the loss in weight of a brass gear running against a stainless steel gear. As can be seen from the data the weight loss is lowest for the lithium 2-ethylhexoate grease.

In order to compare the properties of the lithium 2-ethylhexoate greases made with a methyl phenyl polysiloxane oil similar to that used in Example 1, a series of tests were conducted using the ASTM grease tester referred to in Example 4 employing therein not only a lithium 2-ethylhexoate grease, but also a grease made with other soaps, as, for example, one made with lithium myristate, one made with lithium-caprate, and one in which there was a mixture of soaps of which 90 per cent of the soap was lithium 2-ethylhexoate and 10 per cent of the soap was lithium myristate. The lithium 2-ethylhexoate grease employed was identical with the one prepared as in Example 4 and the grease using both lithium 2-ethylhexoate and lithium myristate was identical with the one prepared in Example 10. The lithium caprate grease comprised the aforementioned methyl phenyl polysiloxane oil and an amount of lithium caprate which was equal to about 23.2 per cent of the total weight of the latter and the silicone oil. The lithium myristate grease comprised, by weight thereof, about 20 per cent of lithium myristate. All greases had the same ASTM penetration of 300. In conducting the test on the ASTM grease tester which had two special heat-treated high temperature No. 306 bearings, rather than pack all bearings full of grease, only 1 gram was used in each bearing. All tests were run to failure of the bearings at 200° C. which usually resulted in destruction of the retainer ring of the bearings. The results of these tests were as follows:

Lithium myristate, 64 hours at 200° C.
Lithium caprate, 77 hours at 200° C.
Lithium 2-ethylhexoate, 309 hours at 200° C.
Lithium 2-ethylhexoate (90 per cent), lithium myristate (10 per cent), 144 hours at 200° C.

Using the same four greases described immediately above, the ASTM grease tester was packed with 120 grams per bearing while the temperature at which these tests were conducted was at 200° C. The following results on the same four greases are shown below:

Lithium myristate, less than 100 hours
Lithium caprate, 1764 hours
Lithium 2-ethylhexoate, 2497 hours
Lithium 2-ethylhexoate (90 per cent), lithium myristate (10 per cent), 2116 hours.

The results described in Example 11 emphasize the marked advantage in using lithium 2-ethylhexoate as the soap in making greases with silicone oils. These advantages and improvements in the greases disclosed and claimed by me are quite unexpected and show an ability to operate at high temperatures with very high soap concentrations much better than greases using a longer-chain lithium soap and unexpectedly show that a difference of only two carbon atoms, for example, in the lithium caprate as compared to the lithium 2-ethylhexoate, makes a marked difference in the results of the properties of the grease.

Although methyl polysiloxane oils and methyl phenyl polysiloxane oils have been employed in the examples described above, it will be apparent to those skilled in the art that other liquid organopolysiloxanes, many examples of which have been described previously or are described more specifically in the aforementioned Patnode patent, which oils may be cyclic, straight-chain, branched-chain, cross-linked and in general having the Si–O linkage, may be employed without departing from the scope of the invention.

In addition, other methods of preparing the greases may be used, many of such methods being well-known in the grease art. If desired, the soap may be first dispersed in the silicone fluid where it is maintained in suspension by suitable stirring or mixing means. The suspension is then heated to a solvation temperature of the soap, which temperature is determined empirically and is dependent upon the type and quantity of the ingredients being processed. At this solvation temperature which, in general, would be within the range of anywhere from 250° F. to 400° F., various other balancing and modifying ingredients such as diesters, oxidation inhibitors, etc., may be added to the system in an amount desired to produce a clear, hot solution. Upon sudden chilling of the hot solution to ambient temperature, a grease is produced that is essentially a silicone-base grease.

As will be apparent to those skilled in the art, the amount of lithium 2-ethylhexoate to silicone oil may be varied, also. Generally, on a weight basis for each part of lithium 2-ethylhexoate used, I may employ from 1 to 9 or more parts of the silicone base fluid either alone or combined with other modifying ingredients as, for instance, those diesters described previously, which can also be varied widely in amount. The ratio of ingredients will depend on the type of grease desired and the application for which the grease is intended.

According to my invention, superior greases can be prepared from a mixture of lithium 2-ethylhexoate and silicone oils. These greases have remarkable oxidation resistances at elevated temperatures, and low bleeding and evaporation rates, and are quite heat stable. Their dropping points are high and show outstanding lubricity over a very wide temperature range of from low temperatures to high temperatures. So far as is known, the greases herein described can be operated at temperatures of 200° C. or even higher for longer periods of time than has heretofore been possible by greases now known in the art.

The properties of the greases may be further improved, as pointed out previously, by incorporating various modifying agents or balancing agents, particularly diesters of the type described previously. In general, useful greases may be prepared by forming a mixture of ingredients comprising, by weight, 10 to 50 parts lithium 2-ethylhexoate, and 90 to 50 parts of a fluid blend of between about 0 and about 95 parts, by weight, of a diester of a dicarboxylic acid and between about 5 to 100 parts, by weight, of a liquid silicone. Generally, it is preferred that the silicone oil comprises the major proportion of the grease and is preferred as regards the major proportion of the fluid blend when mixed, for example, with diesters of a dicarboxylic acid where the grease (with or without the diester) is to be used in high temperature applications, for example, in motors, in bearing surfaces for heavy mill machinery, conveyor belts, etc.

What I claim as new and desire to secure by Letters Patent of the United States is:

1. A grease composition consisting essentially of a major proportion of a liquid organopolysiloxane base fluid and a minor proportion of a thickening agent consisting of lithium 2-ethylhexoate, the organic groups in the aforesaid organopolysiloxane being selected from the class consisting of methyl and phenyl groups and the latter organic groups being present in the ratio of from 1.95 to 2.25 organic groups per silicon atom.

2. A grease composition consisting essentially of a major proportion of a liquid methyl polysiloxane containing an average of from 1.95 to 2.25 methyl groups per silicon atom, and a minor proportion of a thickening agent comprising lithium 2-ethylhexoate.

3. A grease composition consisting essentially of a major proportion of a methyl and phenyl polysiloxane base fluid containing from 1.95 to 2.25 total methyl and phenyl groups per silicon atom, and a minor proportion of a thickening agent comprising lithium 2-ethylhexoate.

NORMAN G. HOLDSTOCK.

REFERENCES CITED

The following references are of record in the file of this patent:

UNITED STATES PATENTS

| Number | Name | Date |
|---|---|---|
| 2,456,642 | Merker | Dec. 21, 1948 |
| 2,566,793 | Davies | Sept. 4, 1951 |
| 2,580,570 | McCarthy | Jan. 1, 1952 |